United States Patent Office 3,511,802
Patented May 12, 1970

3,511,802
STABILIZED POLYPROPYLENE RESIN COMPOSITION
Gordon C. Newland, Kingsport, Tenn., and John W. Tamblyn, Jonas Ridge, N.C., assignors to Eastman Kodak Company, Rochester, N.Y., a corporation of New Jersey
No Drawing. Continuation-in-part of application Ser. No. 702,192, Feb. 1, 1968. This application June 10, 1968, Ser. No. 735,558
Int. Cl. C08f 45/54, 45/58, 45/04
U.S. Cl. 260—41                                12 Claims

ABSTRACT OF THE DISCLOSURE

A thermoplastic composition which includes polypropylene and a stabilizer combination comprising titanium dioxide and a compound selected from the group consisting of p-t-butylphenol; 2,6-didodecyl-p-cresol; 2,4-dimethyl-6-octadecyl phenol; 2,6-bis(1-methylheptyl)-p-cresol; 2-dodecyl-p-cresol; 2-(1-methylheptadecyl)-p-cresol; 2-(trimethyl hexyl)-p-cresol; 2,6-bis(1-methylundecyl)-p-cresol; 2,6-bis(trimethyl hexyl)-p-cresol; and 2-(1-methylheptyl)-p-cresol.

---

This application is a continuation-in-part of Ser. No. 702,192, filed Feb. 1, 1968, and now abandoned, which in turn is a division of Ser. No. 427,476, filed Jan. 22, 1965, now U.S. Pat. No. 3,396,143, issued Aug 6, 1968.

This invention relates to polypropylene and to the problem of inhibiting deterioration of polypropylene subjected to outdoor weathering conditions, particularly ultraviolet light.

Polypropylene has generally gained widespread use as materials of construction. However, as is well known, normally solid polypropylene resins undergo photochemical degradation when exposed to ultraviolet light. This effect is frequently termed weathering. It appears to be a photooxidation process which causes rupture of the polymer chains and formation of carbonyl ($=C=O$) groups. As this degradation progresses, articles manufactured from polypropylene resins tend to crack, become brittle and lose tensile strength to the extent of mechanical failure.

This invention is based upon the discovery that certain mixtures of titanium dioxide and specific organic compounds, when incorporated into polypropylene resins, not only enhance the weatherability of these resins, but do so synergistically.

Briefly, the invention comprises a thermoplastic composition comprising (A) polypropylene, and (B) a stabilizing amount of a mixture of titanium dioxide and a phenolic compound selected from the group consisting of p-t-butylphenol; 2,6-didodecyl-p-cresol; 2,4-dimethyl-6-octadecyl phenol; 2,6-bis(1-methylheptyl)-p-cresol; 2-dodecyl-p-cresol; 2-(1-methylheptadecyl)-p-cresol; 2-(trimethyl hexyl)-p-cresol; 2,6-bis(1-methylundecyl)-p-cresol; 2,6-bis(trimethylhexyl)-p-cresol; and 2-(1-methylheptyl)-p-cresol.

Polypropylene is a well known 1-olefin resin and is fully described in the literature.

Titanium dioxide is a well known material commonly used as a white pigment. In general, it is a finely divided solid commercially available in at least two crystalline forms, the anatase and rutile forms. The concepts of this invention include both forms. A suitable concentration of titanium dioxide in the composition of this invention is generally about 0.25–10% by weight of the polypropylene resin. It is also pointed out that the concentration of titanium dioxide used may also serve to pigment the polypropylene.

The phenolic compounds forming a part of the invention are either commercially available or may be prepared in accordance with conventional procedures well known to those skilled in the art.

For example, the mono- or di-(straight-chain) alkyl-p-cresol may be prepared from p-cresol by a stepwise acylation followed by reduction of the ketonic side chain. A single sequence of these steps provides a mono-substituted p-cresol in the 2 position whereas a double sequence of these steps provides a di-substituted p-cresol in the 2 and 6 positions. The acylation and reduction steps may be carried out with the appropriate reactants according to known conditions.

The preparation of 2,4-dimethyl-6-octadecyl phenol is similar to the above preparation with the exception that 2,4-dimethyl phenol is used as the starting material. In other words, a single sequence of acylation and reduction steps is necessary.

The mono- or di-(branched-chain) alkyl-p-cresols may be prepared by a conventional alkylation procedure of p-cresol with an appropriate α-olefin. The molar concentration of the p-cresol to the α-olefin controls whether the product is predominantly mono-substituted or di-substituted.

The concentration of the phenolic compound in the compositions of this invention may generally be in a range of about 0.01 to 5.0% by weight based on the polypropylene, preferably 0.01 to 3.0%.

The thermoplastic composition of this invention can also comprise other additive such as, for example, antioxidants, heat stabilizers, additional ultraviolet light inhibitors, anticorrosion additives, pigments, antistatic agents, foaming agents, plasticizers, waxes, mold release agents, slip agents, antiblocking agents, fillers, extenders and the like, including physical property improvers including other polymeric compounds.

The thermoplastic composition of this invention is made by incorporating the components thereof into the polypropylene resin. Generally such incorporation is performed by any one of a number of well known methods, such as roll compounding, extrusion, solvent mixing and the like. For example, such incorporation can be performed by heating or otherwise softening the polypropylene resin to a workable consistency and then working in as by roll compounding until a substantially uniform mixture or dispersion is obtained.

The resulting thermoplastic composition of this invention is then usually formed into articles such as pellets, sheeting, films, bars, tubes, filaments, specially shaped articles and the like as by conventional casting and molding techniques which include extrusion, compression molding, blow molding and the like.

The invention is further illustrated by the following examples.

EXAMPLE 1

A series of test samples made from crystalline polypropylene having an inherent viscosity of 1.8 are evaluated for stability toward outdoor weathering conditions, particularly ultraviolet light.

The samples are formulated by admixing the components for about five minutes in a C. W. Brabender Plastograph and include the formulations indicated in the following table. The formulation obtained in each case is granulated and injection molded into $\frac{1}{16}$ inch tensile bars 2½ inches long. Three tensile bars of each sample are then mounted under stress in a ⅝ inch wide channel and the channel placed into the modified Atlas Twin-Arc Weather-Ometer [Anal. Chem., 25, 460 (1953)]. While exposed in this apparatus to simulated weathering conditions including ultraviolet light, the stressed tensile bars are periodically inspected for the development of stress cracks visible under 3X magnification (Dazor Floating Fixture Model M-209). When such stress cracks are found to have developed in a specimen, the period of exposure for that specimen is then determined. In such fashion the stress crack-free life of the sample is determined, it being the average exposure time for all three specimens to develop stress cracks. The results of the tests are summarized in the following table.

TABLE 1

| Components | Concentration in parts by wt. | | | |
|---|---|---|---|---|
| | Sample 1 | Sample 2 | Sample 3 | Sample 4 |
| Crystalline polypropylene | 100 | 100 | 100 | 100 |
| Titanium dioxide (anatase) | | 1.5 | | 1.5 |
| p-t-Butylphenol | | | 1.5 | 1.5 |
| Stress crack-free life (hrs.) | 140 | 160 | 212 | 638 |

From the above data it is demonstrated that titanium dioxide and p-t-butyl phenol cooperate to synergistically inhibit ultraviolet light deterioration of polypropylene.

EXAMPLE 2

Another series of test samples made from polypropylene having an inherent viscosity of 1.79, density of 0.915 and a melt flow of 4.52 are evaluated for stability toward outdoor weathering conditions including ultraviolet light.

The samples are formulated by blending the components in a C. W. Brabender Plastograph and include the formulations indicated in the following table. Each formulation is then granulated and injection molded into tensile specimens 2.5 in. by 0.5 in. by 1/16 in. thick having a gage section 1 in. by 0.25 in. The tensile specimens are bent in a U shape and inserted in an aluminum channel 5/8 in. wide and 1/2 in. deep. Three specimens of each composition are exposed to simulated weathering conditions in a modified [Anal. Chem., 25, 460 (1953)] Atlas Twin-Arc Weather-Ometer. While exposed to the simulated weathering conditions the stressed tensile bars are periodically inspected for the development of stress cracks visible under 3X magnification. The hours of exposure required to develop cracks in the specimens are recorded. The stress-crack life of each composition is calculated as the averaged exposure hours required to develop cracks in the three specimens. The results of the tests are summarized in the attached table.

TABLE 2

| Polypropylene plus the following additives | | Stress crack-free life (hrs.) |
|---|---|---|
| 1% phenolic compound | Percent TiO₂ | |
| None | None | 90 |
| Do | 1.5 | 90 |
| 2,6-didodecyl-p-cresol | None | 118 |
| Do | 1.5 | 283 |
| 2,4-dimethyl-6-octadecyl phenol | None | 118 |
| Do | 1.5 | 307 |
| 2,6-bis(1-methylheptyl)-p-cresol | None | 118 |
| Do | 1.5 | 283 |
| 2-dodecyl-p-cresol | None | 141 |
| Do | 1.5 | 616 |
| 2-(1-methylheptadecyl)-p-cresol | None | 118 |
| Do | 1.5 | 271 |
| 2-(trimethylhexyl)-p-cresol | None | 118 |
| Do | 1.5 | 336 |
| 2,6-bis(1-methylundecyl)-p-cresol | None | 118 |
| Do | 1.5 | 236 |
| 2,6-bis(trimethylhexyl)-p-cresol | None | 118 |
| Do | 1.5 | 236 |
| 2-(1-methylheptyl)-p-cresol | None | 118 |
| Do | 1.5 | 433 |

As demonstrated by the data in the above table the selected phenolic compounds in combination with TiO₂ produce synergistic stabilizing effects in polypropylene.

It is also pointed out that additional synergistic stabilizing effects may be achieved by adding a third component to the stabilizer combination, namely an ultraviolet light inhibitor such as 4-dodecyloxy-2-hydroxybenzophenone.

From the above discussion it is evident that the compositions of this invention are synergistically stabilized against the degradative effects of ultraviolet light.

These and other features, advantages and specific embodiments of this invention will be readily apparent to those in the exercise of ordinary skill in the art upon reading the foregoing disclosures. In this connection, while specific embodiments have been described in considerable detail, variations and modifications of these embodiments can be effected without departing from the spirit and scope of the invention as disclosed and claimed.

We claim:
1. A thermoplastic composition comprising normally solid polypropylene and a stabilizing amount of a mixture of from about 0.25 to about 10% by weight of titanium dioxide and from about 0.01 to about 5.0% by weight of at least one phenolic compound selected from the group consisting of p-t-butylphenol; 2,6-didodecyl-p-cresol; 2,4-dimethyl-6-octadecylphenol; 2,6-bis(1-methylheptyl)-p-cresol; 2-dodecyl-p-cresol; 2-(trimethylhexyl)-p-cresol; 2 - (1 - methylheptadecyl)-p-cresol; 2,6-bis(1-methylundecyl)-p-cresol; 2,6-bis(trimethylhexyl)-p-cresol; and 2-(1-methylheptyl)-p-cresol.

2. The thermoplastic composition of claim 1 wherein the titanium dioxide content is above about 1.5 percent by weight.

3. The thermoplastic composition of claim 1 wherein the phenolic compound is p-t-butylphenol.

4. The thermoplastic composition of claim 1 wherein the phenolic compound is 2,6-didodecyl-p-cresol.

5. The thermoplastic composition of claim 1 wherein the phenolic compound is 2,4 - dimethyl - 6 - octadecylphenol.

6. The thermoplastic composition of claim 1 wherein the phenolic compound is 2,6 - bis(1 - methylheptyl)-p-cresol.

7. The thermoplastic composition of claim 1 wherein the phenolic compound is 2-dodecyl-p-cresol.

8. The thermoplastic composition of claim 1 wherein the phenolic compound is 2-(trimethylhexyl)-p-cresol.

9. The thermoplastic composition of claim 1 wherein the phenolic compound is 2 - (1-methylheptadecyl)-p-cresol.

10. The thermoplastic composition of claim 1 wherein the phenolic compound is 2,6 - bis(1-methylundecyl)-p-cresol.

11. The thermoplastic composition of claim 1 wherein the phenolic compound is 2,6 - bis(trimethylhexyl)-p-cresol.

12. The thermoplastic composition of claim 1 wherein the phenolic compound is 2-(1-methylheptyl)-p-cresol.

References Cited

UNITED STATES PATENTS 2,957,849  10/1960  Kennedy _____ 260—45.95
3,347,938  10/1967  Bell et al. _____ 260—624

ALLAN LIEBERMAN, Primary Examiner

U.S. Cl. X.R.
260—45.75, 45.95